United States Patent
Wagle et al.

(10) Patent No.: US 12,024,669 B2
(45) Date of Patent: Jul. 2, 2024

(54) C-36 DIMER DIAMINE HYDROCHLORIDE SALT AS PRIMARY VISCOSIFIER FOR INVERT-EMULSION DRILLING FLUIDS

(71) Applicant: Saudi Arabian Oil Company, Dhahran (SA)

(72) Inventors: Vikrant Wagle, Dhahran (SA); Abdullah Saleh Hussain Al-Yami, Dhahran (SA); Omprakash Pal, Dhahran (SA); Ali Mohammed Hussain Al Safran, Dhahran (SA); Khawlah Alanqari, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 18 days.

(21) Appl. No.: 17/850,368

(22) Filed: Jun. 27, 2022

(65) Prior Publication Data
US 2023/0416587 A1 Dec. 28, 2023

(51) Int. Cl.
*C09K 8/035* (2006.01)
*C09K 8/03* (2006.01)
*E21B 21/06* (2006.01)

(52) U.S. Cl.
CPC .............. *C09K 8/035* (2013.01); *C09K 8/032* (2013.01); *E21B 21/065* (2013.01)

(58) Field of Classification Search
CPC ........... C09K 8/035; C09K 8/032; C09K 8/36
See application file for complete search history.

(56) References Cited

U.S. PATENT DOCUMENTS

| | | | |
|---|---|---|---|
| 2,761,843 | A | 9/1956 | Brown |
| 4,493,771 | A | 1/1985 | Wilson et al. |
| 4,515,708 | A | 5/1985 | Haslegrave et al. |
| 4,717,488 | A | 1/1988 | Seheult et al. |
| 5,057,467 | A | 10/1991 | Croft |
| 5,558,171 | A | 9/1996 | McGlothlin et al. |
| 5,593,953 | A | 1/1997 | Malchow, Jr. |
| 5,641,385 | A | 6/1997 | Croft et al. |
| 6,153,049 | A | 11/2000 | Croft |
| 6,312,560 | B1 | 11/2001 | Croft |
| 6,823,940 | B2 | 11/2004 | Reddy et al. |
| 6,866,797 | B1 | 3/2005 | Martin et al. |
| 7,287,593 | B2 | 10/2007 | Hutchins et al. |
| 7,776,798 | B2 | 8/2010 | Subramanian et al. |
| 7,863,228 | B2 | 1/2011 | Loper et al. |

(Continued)

FOREIGN PATENT DOCUMENTS

| | | |
|---|---|---|
| CN | 113912348 | 1/2022 |
| EP | 0245930 | 11/1987 |

(Continued)

OTHER PUBLICATIONS

U.S. Appl. No. 17/850,363, Wagle et al., filed Jun. 27, 2022.

(Continued)

*Primary Examiner* — Aiqun Li
(74) *Attorney, Agent, or Firm* — Fish & Richardson P.C.

(57) ABSTRACT

Methods for making and using an invert-emulsion drilling fluid, and the invert-emulsion drilling fluid are provided. An exemplary invert-emulsion drilling fluid includes a C-36 dimer diamine dihydrochloride salt (CDDH), an aqueous solvent, a non-aqueous solvent, an emulsifier, and calcium chloride.

6 Claims, 6 Drawing Sheets

(56) References Cited

U.S. PATENT DOCUMENTS

| | | |
|---|---|---|
| 7,939,470 B1 | 5/2011 | Wagle et al. |
| 8,936,111 B2 | 1/2015 | Maghrabi et al. |
| 8,950,492 B2 | 2/2015 | Maghrabi et al. |
| 9,127,192 B2 | 9/2015 | Maghrabi et al. |
| 9,296,937 B2 | 3/2016 | Wagle et al. |
| 9,296,941 B2 | 3/2016 | Wagle et al. |
| 9,346,995 B2 | 5/2016 | Wagle et al. |
| 9,434,911 B2 | 9/2016 | Bennett et al. |
| 9,469,803 B2 | 10/2016 | Wagle et al. |
| 9,518,206 B2 | 12/2016 | Maghrabi et al. |
| 9,650,559 B2 | 5/2017 | Nelson |
| 9,796,907 B2 | 10/2017 | Wagle et al. |
| 9,884,985 B2 | 2/2018 | Al-Subhi et al. |
| 9,951,261 B2 | 4/2018 | Nelson |
| 9,988,569 B2 | 6/2018 | Wagle et al. |
| 10,030,189 B2 | 7/2018 | Wagle et al. |
| 10,214,675 B2 | 2/2019 | Wagle et al. |
| 10,457,847 B2 | 10/2019 | Wagle et al. |
| 10,480,278 B1 | 11/2019 | Sodhi et al. |
| 10,570,326 B2 | 2/2020 | Wagle et al. |
| 10,590,326 B1 | 3/2020 | Reddy |
| 11,286,412 B2 | 3/2022 | Amanullah et al. |
| 11,492,536 B2 | 11/2022 | Alkhalaf et al. |
| 2003/0162668 A1 | 8/2003 | Kirsner et al. |
| 2014/0116708 A1 | 5/2014 | Wadekar et al. |
| 2015/0024975 A1* | 1/2015 | Wagle ............ C09K 8/36 507/117 |
| 2016/0208158 A1 | 7/2016 | Monahan et al. |
| 2022/0259486 A1 | 8/2022 | Alkhalaf et al. |
| 2022/0363971 A1 | 11/2022 | Alkhalaf et al. |

FOREIGN PATENT DOCUMENTS

| | | |
|---|---|---|
| WO | WO 2014123709 | 8/2014 |
| WO | WO 2014200671 | 12/2014 |
| WO | WO 2015031270 | 3/2015 |

OTHER PUBLICATIONS

Maxey, "Rheological Analysis of Static and Dynamic Sag in Drilling Fluids," Annual Transactions of the Nordic Rheology Society, 15:181, 2007, 8 pages.

U.S. Appl. No. 17/879,215, Wagle et al., filed Aug. 2, 2022.

An et al., "A strong inhibition of polyethyleneimine as shale inhibitor in drilling fluid," Journal of Petroleum Science and Engineering, Feb. 2018, 161:1-8, 8 pages.

Guancheng et al., "Polyethyleneimine as shale inhibitor in drilling fluid," Applied Clay Science, Jul. 2016, 127-128:70-77, 8 pages.

Glossary.slb.com [online], "pounds per barrel," 2023, retrieved on Dec. 13, 2023, URL<https://glossary.slb.com/en/terms/p/pounds_per barrel>, 2 pages.

* cited by examiner

C-36 DIMER DIAMINE HYDROCHLORIDE SALT AS PRIMARY VISCOSIFIER FOR INVERT-EMULSION DRILLING FLUIDS

TECHNICAL FIELD

The present disclosure is directed to drilling fluids that do not use clay viscosifiers.

BACKGROUND

Conventional invert-emulsion drilling fluids employ organophilic clays (organoclay) as the primary viscosifier. However, organoclays degrade with time, failing to maintain the rheological properties of the drilling fluid. Typically, this may be helped by increasing the amounts of organoclay or low gravity solids (LGS) to the drilling fluids. As used herein, low gravity solids are a type of drilling-fluid solid having a lower density than the commonly used barite or hematite that is used to weight up a drilling fluid. The low gravity solids include drill solids plus the added bentonite clay. Overtreatment with organoclay increases the cost of drilling. For example, it may affect other drilling fluid properties, requiring further treatment that adds to the cost. The addition of excess amount of organoclay also increases the plastic viscosity and the solids volume percentage, which lowers the rate of penetration, increasing the cost of drilling.

The changes in drilling fluid rheology that occur with changes in pressure and temperature due to increasing depth of the well will cause changes in the equivalent circulation density (ECD) while drilling. Fluctuations in ECD can lead to fracturing of a formation when operating in a narrow window of pore pressure and fracture gradient, for example, at high reservoir pressure. This can lead to formation damage and mud losses thereby increasing drilling costs. The use of thinner fluids to minimize rheology fluctuations may provide lower ECDs, but the fluid rheology must enable removal of cuttings and assist in suspending drilling solids.

SUMMARY

An embodiment described in examples herein provides a method for preparing an invert-emulsion drilling fluid. The method includes reacting a C-36 dimer diamine with hydrochloric acid to form a C-36 dimer diamine dihydrochloride (CDDH). A non-aqueous solvent is mixed with an emulsifier to form an initial mixture. Calcium chloride is dissolved in water to form a calcium chloride solution. The CDDH is dissolved in the calcium chloride solution to form a CDDH solution. The CDDH solution is mixed with the initial mixture while stirring to form the invert-emulsion drilling fluid.

Another embodiment described in examples herein provides an invert-emulsion drilling fluid. The invert-emulsion drilling fluid includes a C-36 dimer diamine dihydrochloride (CDDH), an aqueous solvent, a non-aqueous solvent, an emulsifier, and calcium chloride.

Another embodiment described in examples herein provides a method for drilling a wellbore with an invert-emulsion drilling fluid. The method includes preparing the invert-emulsion drilling fluid by reacting a C-36 dimer diamine with hydrochloric acid to form a C-36 dimer diamine dihydrochloride (CDDH), dissolving the CDDH in water to form a CDDH solution, dissolving calcium chloride in the CDDH solution, mixing an emulsifier with a non-aqueous solvent to form an initial mixture, adding the CDDH solution to the initial mixture to form the invert-emulsion drilling fluid. Drilling fluid additives are added to the invert-emulsion drilling fluid to form a drilling mud. The drilling mud is used to remove cuttings from the wellbore during drilling.

DETAILED DESCRIPTION

Embodiments described in examples herein are directed to the synthesis and application of a primary viscosifier, or low-end rheology modifier, for organoclay-free invert-emulsion drilling fluids. The low-end rheology modifier synthesized is a dihydrochloride salt of a C-36 dimer diamine. Addition of the C-36 dimer diamine dihydrochloride (CDDH) as a primary viscosifier to a 90 pcf (pounds per cubic foot; 1441 kg/m$^3$) organoclay-free invert-emulsion drilling fluid showed a substantial increase in the low shear yield point with a corresponding minimal increase in the plastic viscosity when compared with a 90 pcf organoclay-free invert-emulsion drilling fluid formulated in the absence of CDDH.

This research involves formulation of high low-end rheology and low plastic viscosity organoclay-free invert-emulsion drilling fluids. Fluids with low plastic viscosity (PV) will have minimal impact on the equivalent circulating densities (ECDs) and lead to higher rates-of-penetration (ROPs) while drilling.

The primary viscosifier described herein gives sufficient low end rheology for good hole cleaning and barite (BaSO4) sag resistance without the excessive addition of low gravity solids like organoclay. Replacement of organoclay with the organic primary viscosifier can impart flat rheology to the fluid, which is very essential for drilling deep wells where the temperature gradient is high. As used herein, flat rheology describes a material with a viscosity that changes very little (for example, less than about 5%, 10%, or 20%) across a wide strain and temperature range.

Figure 1:
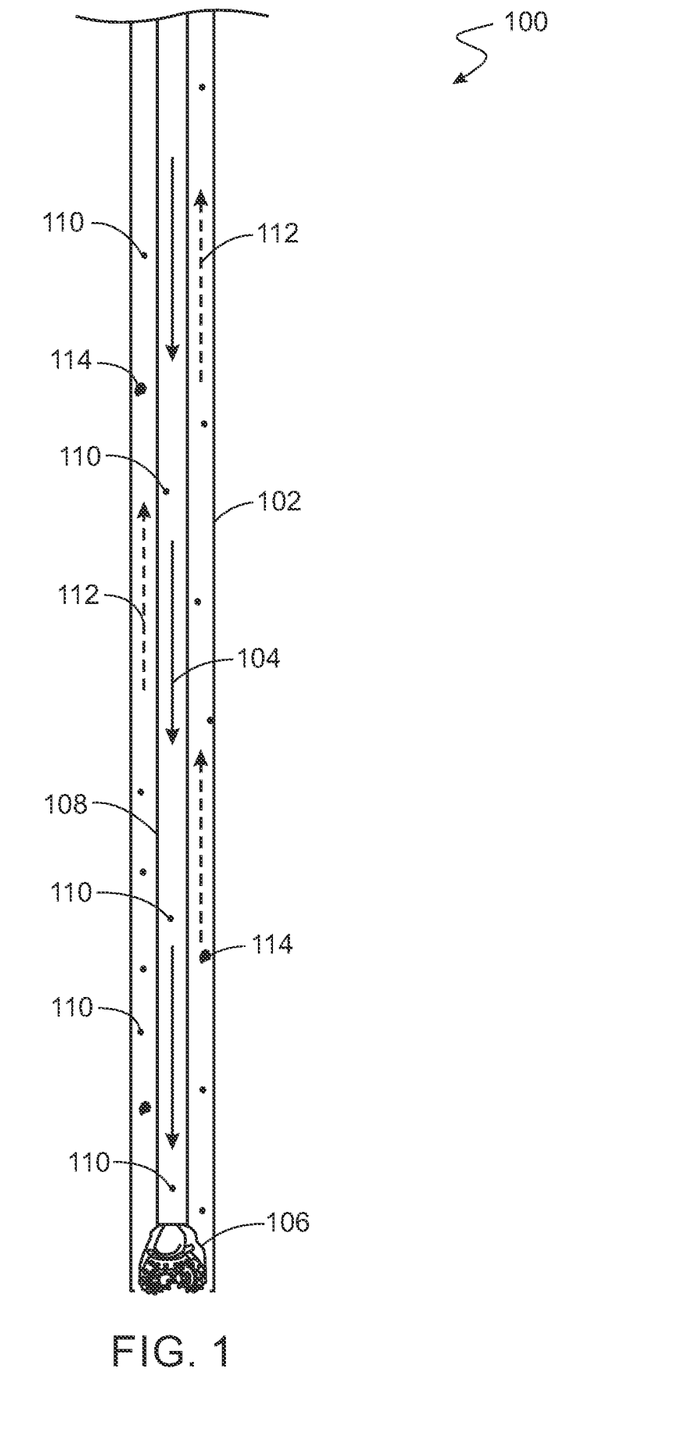
FIG. 1 is a schematic drawing of the drilling of a wellbore using an invert-emulsion drilling fluid that uses a C-36 dimer diamine hydrochloride salt as a viscosifier.

FIG. 1 is a schematic drawing 100 of the drilling of a wellbore 102 using an invert-emulsion drilling fluid 104 that uses a C-36 dimer diamine hydrochloride salt (CDDH) as a viscosifier. For clarity, not every individual item is labeled. During the drilling, the invert-emulsion drilling fluid 104 is pumped to the drill bit 106 through a drill string 108. In some embodiments, in addition to the CDDH, the invert-emulsion drilling fluid 104 includes barite particles 110 to increase the density of the invert-emulsion drilling fluid 104.

In some embodiments, the drill bit 106 is rotated as the drill string 108 is advanced in the wellbore 102, penetrating the subsurface rock formations. In some embodiments, the drill string 108 is not rotated, but a mud motor powered by the flow of the invert-emulsion drilling fluid 104 is used to power the drill bit 106. The invert-emulsion drilling fluid 104, carrying the barite particles 110, flows through the drill bit 106, and is returned to the surface by an upwards flow 112 through the wellbore 102 in the annulus outside of the drill string 108. The upwards flow 112 of the invert-emulsion drilling fluid 104 carries cuttings 114 from the rock face at the bottom of the wellbore 102 back to the surface.

At the surface, the cuttings 114 are separated from the invert-emulsion drilling fluid 104. After separation, the invert-emulsion drilling fluid 104 is recycled to the wellbore 102 to continue the process.

Figure 2:
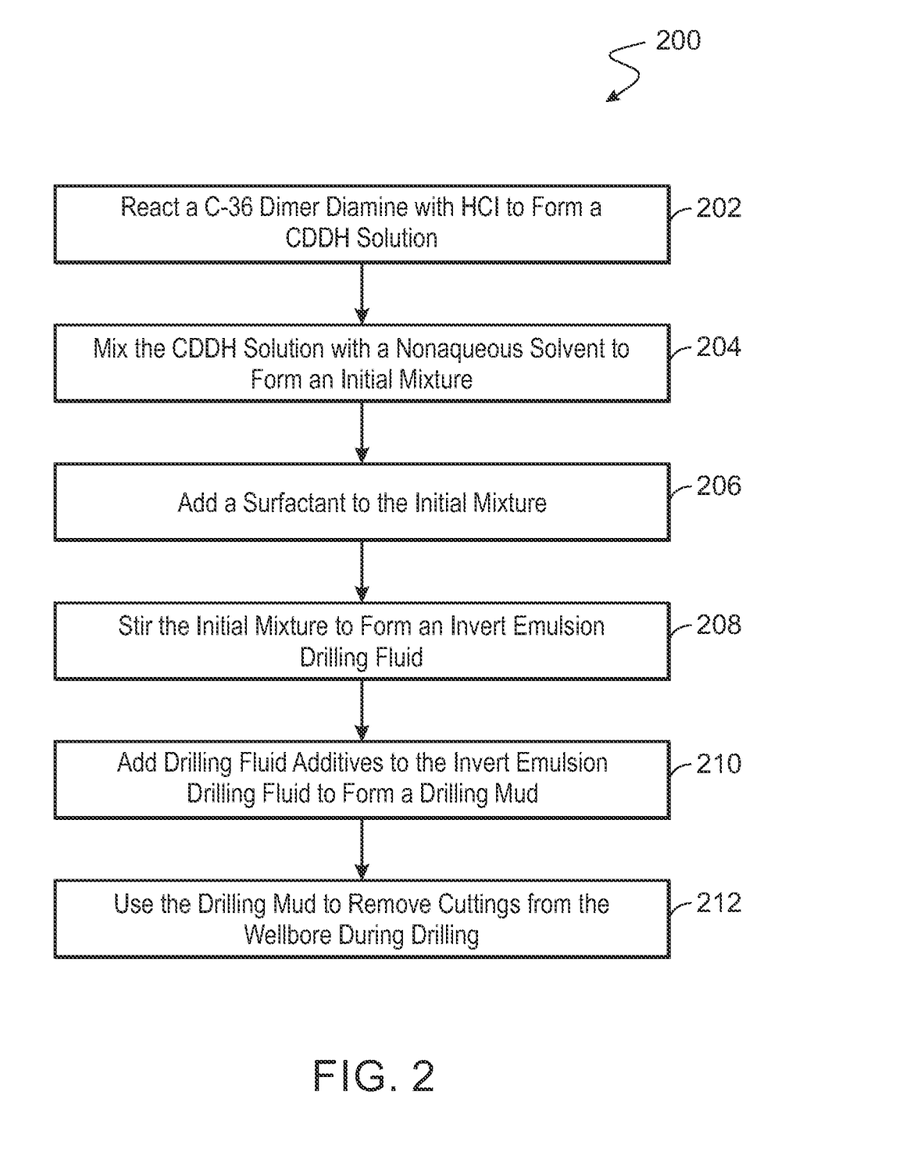
FIG. 2 is a process flow diagram of a method for drilling a drilling fluid that uses a C-36 dimer diamine hydrochloride salt as a viscosifier.

FIG. 2 is a process flow diagram of a method 200 for drilling a wellbore that uses a C-36 dimer diamine hydrochloride salt (CDDH) as a viscosifier. The method 200 begins at block 202 by reacting a C-36 dimer diamine with concentrated hydrochloric acid to form a solid CDDH product. In some embodiments, at block 204, water is then used to dissolve the CDDH solid to form a CDDH solution. The amount of water and CDDH used depends on the final volume ratio of nonaqueous solvent to aqueous solvent desired in the invert-emulsion drilling fluid. For example, the CDDH may be mixed with water to form an invert-emulsion drilling fluid at between 0.5 ppb (pounds per barrel) and 20 ppb, or between about 2 ppb and 10 ppb. In some embodiments, the CDDH is at about 3 ppb. In some embodiments, the CDDH is about 6 ppb.

At block 206, an emulsifier, or surfactant, is mixed with a nonaqueous solvent to form an initial mixture. The nonaqueous solvent may be diesel oil, mineral oil, or purified mineral oil, or the like. The emulsifier may be an alkyl group attached to an alkyl carboxylic acid moiety, with or without double bonds or branches in the backbone of the alkyl group. The alkyl group may include any number of carbons in the chain, which may be selected by the efficacy of the emulsion stabilization. For example, the alkyl group may be 6 carbons in length, 12 carbons in length, 18 carbons in length, 24 carbons in length, 30 carbons in length or higher. Higher numbers of carbons in the backbone of the alkyl group may improve the emulsion stabilization up to a certain point, where higher numbers of carbon beyond that point may result in lower stabilization efficiency due to tangling of the carbon chain. Other types of emulsion stabilizers, such as amides, polyethylene-poly ethylene oxide block copolymers, sulfonates, and the like may be used. At block 208, lime, for example, including CaO, or both CaO and $CaOH_2$, is added to the initial mixture to form an activated solution.

In some embodiments, at block 210, a filtration control agent is added to the activated solution. The filtration control agent reduces fluid loss from permeable formations or zones that the wellbore passes through. Any number of filtration control agents may be used including gelation agents, filter cake formation agents, and the like.

At block 212, calcium chloride ($CaCl_2$) is mixed with the CDDH solution to form a calcium chloride solution. The calcium chloride may be added at between about 15 ppb and about 50 ppb, or between about 20 and about 45 ppb, or at about 30 ppb of the final invert-emulsion drilling fluid. In one embodiment, the calcium chloride is added at 29.8 ppb. The amount of the water used for the $CaCl_2$ solution is selected by the final volume percentage of nonaqueous solvent to aqueous solvent desired in the drilling fluid. For example, the volume ratio of the nonaqueous solvent to the aqueous solvent may be 95 vol. % to 5 vol. % (95/5), 90/10, 80/20, 70/30, or 60/40. At block 214, the $CaCl_2$ solution is slowly added to the base nonaqueous solution during mixing to form an invert-emulsion drilling fluid.

At block 216, drilling fluid additives are added to the invert-emulsion drilling fluid to form a drilling mud. The drilling fluid additives can include barite ($BaSO_4$), which is added to adjust the density of the drilling fluid. Other drilling fluid additives that may be used in embodiments include a corrosion inhibitor, among others. While the composition described herein removes the need for organoclay to be added to the invert emulsion drilling mud for viscosity improvement, organoclay may be used with the other additives described herein.

At block 218, the drilling mud, including the invert-emulsion drilling fluid with the drilling fluid additives, is pumped through the drill string to the drill bit to remove rock cuttings from the wellbore during the drilling operation. After flowing through the drill bit, the drilling mud flows back up the annulus of the wellbore, for example, outside of the drill string carrying cuttings to the surface. At the surface, the cuttings are separated from the drilling mud, for example, by a settling process, and the separated drilling mud is recycled to the wellbore.

Examples

Synthesis of a C-36 dimer diamine dihydrochloride salt (CDDH)

Figure 3:
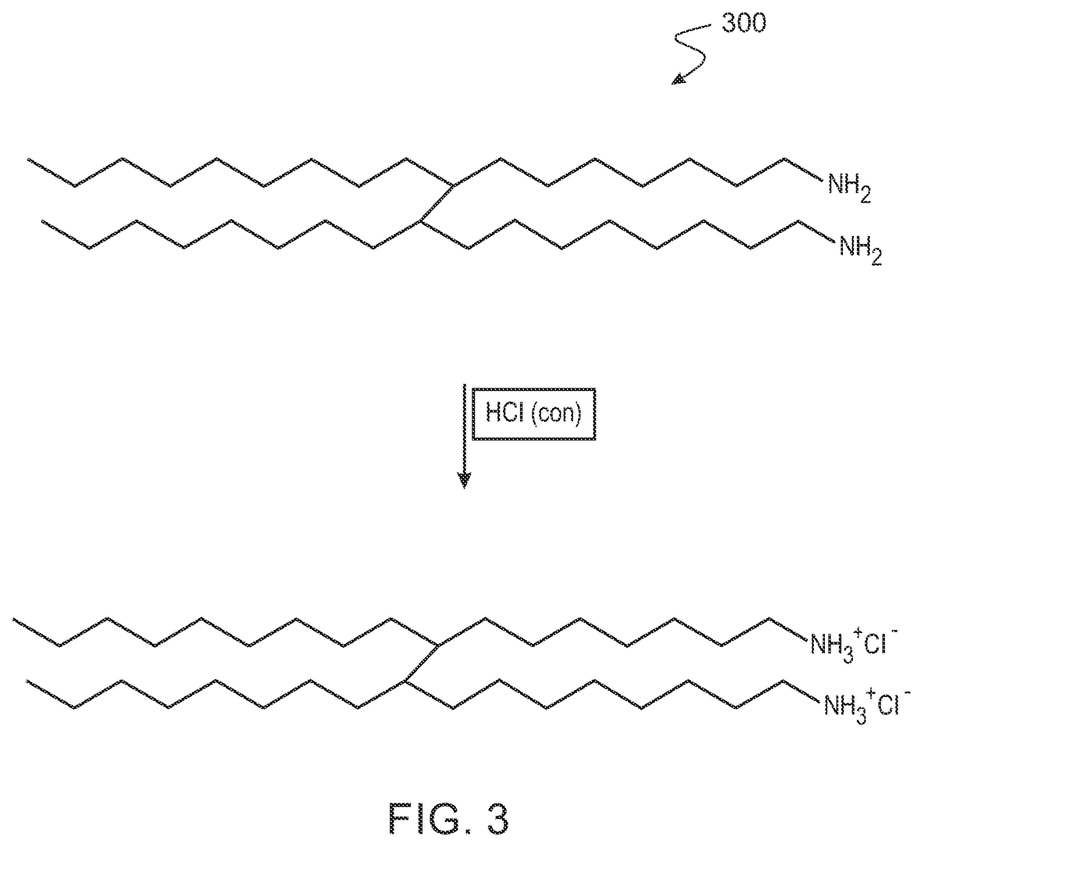
FIG. 3 is a schematic drawing of the synthesis of a C-36 dimer diamine hydrochloride salt (CDDH).

FIG. 3 is a schematic drawing of the synthesis 300 of a C-36 dimer diamine hydrochloride salt (CDDH). The CDDH is synthesized by reacting C-36-dimer diamine with 12.1N concentrated hydrochloric acid, for example, in a stoichiometric amount.

To perform the reaction, 54 g of C-36 dimer diamine was added to a beaker. The C-36 dimer diamine used for the tests was Priamine 1074 from Croda Chemicals of Snaith, UK. The beaker was placed in a cold-water bath to maintain the temperature between about 5° C. and 15° C., or about 10° C. 17 ml of 12.1N concentrated hydrochloric acid was added to the amine in increments of 1 ml with constant stirring, for example, using a glass rod. The acid reacted with the amine to give a semi-solid. The semi-solid was then further vacuum dried at 50° C. to remove any residual water.

Formulation of 90 pcf (pounds per cubic foot; 1441 kg/m$^3$) organoclay-free invert-emulsion drilling fluids with CDDH.

90 pcf organoclay-free invert-emulsion drilling fluids with oil-to water ratio (OWR) 70:30 and a $CaCl_2$ concentration of 250 Kppm wt. % were formulated for the study using the concentrations shown in Table 1.

The mixing of the formulation was performed by adding the materials in the order shown in Table 1. The mixing time used at each step is also shown in Table 1.

The rheology of the fluid was characterized in terms of PV (plastic viscosity), YP (yield point), and LSYP (low shear yield point). The YP and PV are parameters from the Bingham plastic (BP) rheology model. The YP is determined by extrapolating the BP model to a shear rate of zero. The YP represents the stress required to move the fluid. The YP is expressed in the units of lb./100 ft$^2$. The YP indicates the cuttings carrying capacity of the IEF through the annulus, or, in simple terms, the IEFs hole cleaning ability. A YP greater than 15 lb./100 ft$^2$ (0.632 Kg/m$^2$) is considered good for drilling. The PV represents the viscosity of a fluid when extrapolated to infinite shear rate, expressed in units of centipoise (cP). The PV indicates the type and concentration of the solids in the IEF, and a low PV is preferred. Both PV and YP are calculated using 300 revolutions per minute (rpm) and 600-rpm shear rate readings on a standard oilfield viscometer as given in Equations 1 and 2 below.

$$PV = (600 \text{ rpm reading}) - (300 \text{ rpm reading}) \quad \text{Eqn. 1}$$

$$YP = (300 \text{ rpm reading}) - PV \quad \text{Eqn. 2}$$

The yield stress or $Tau_0$ is a parameter from the Herschel Buckley (HB) rheology model. The $Tau_0$ is determined by fitting the HB model to the shear stress versus shear rate curve, which is the viscosity reading plotted against the corresponding rpm as determined on the standard oilfield viscometer. The $Tau_0$ is expressed in similar units to the YP. The $Tau_0$ indicates the susceptibility of the IEF to barite sag: a high Tau0 is expected to deliver a sag resistant IEF. The $Tau_0$ can be estimated reasonably by calculating the LSYP value from Equation 3.

$$LSYP = [2 \times (3 \text{ rpm reading})] - (6 \text{ rpm reading}) \quad \text{Eqn. 3}$$

An LSYP equal to or greater than 7 lbs./100 ft$^2$ (0.349 kg/m$^2$) is considered good for drilling.

Figure 4:
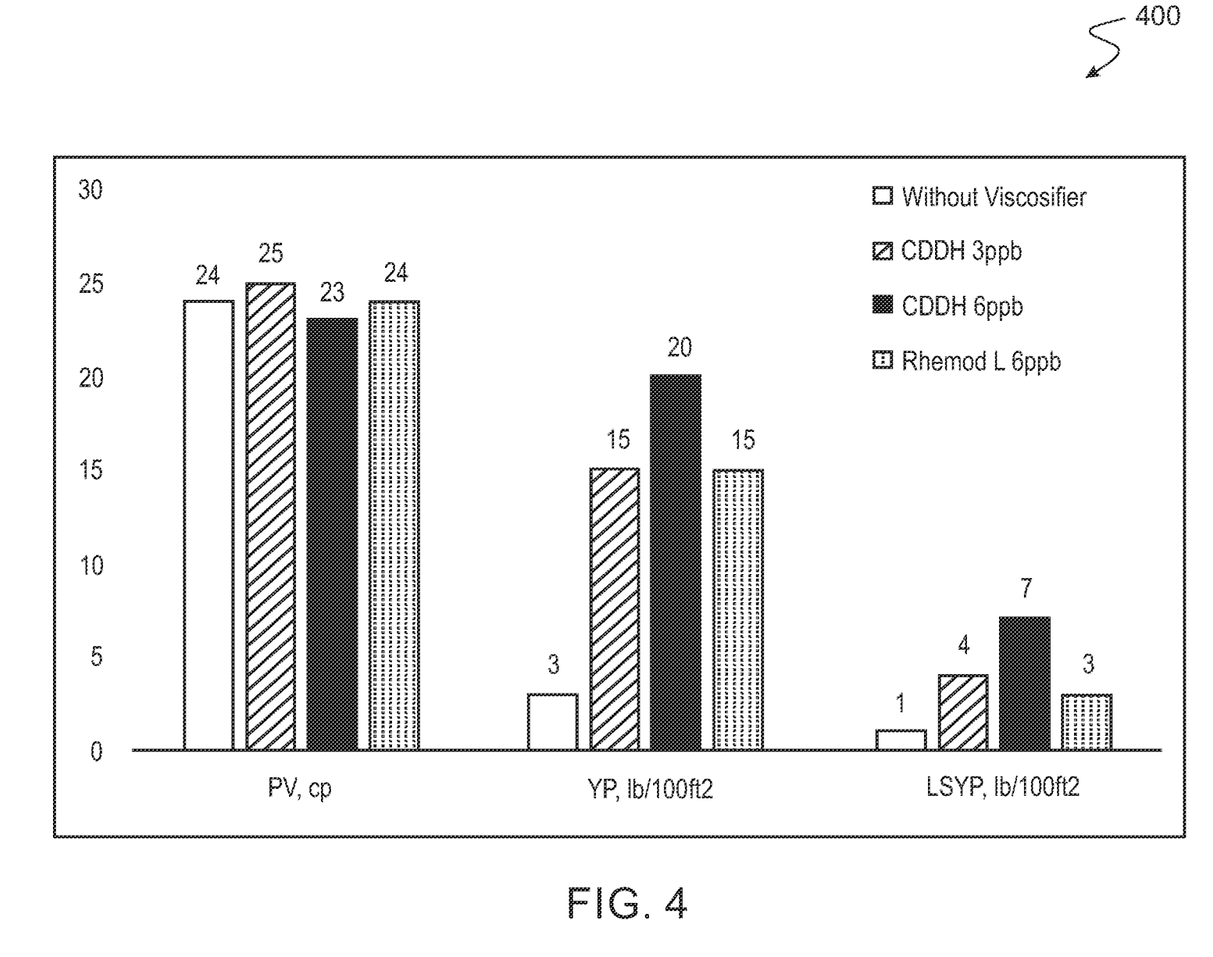
FIG. 4 is a plot comparing the performance of CDDH to a commercial viscosifier in a clay-free drilling fluid.

Table 1 and FIG. 4 show the performance of four different 90 pcf organoclay free, invert-emulsion drilling fluids that were formulated and hot rolled at 250° F. (121° C.) for 16 hours. Fluid 1 was formulated in the absence of any viscosifier while Fluid 2 and Fluid 3 were formulated with 3 ppb (8.6 Kg/m$^3$) and 6 ppb (17.1 Kg/m$^3$) of CDDH. Fluid 4 with 6 ppb Rhemod L was formulated to benchmark the performance of CDDH against a commercial viscosifier. Rhemod L is a C-36 dimer fatty acid, available from Halliburton Co., of Duncan, OK, USA.

Fluid 1 is formulated without CDDH gave a PV, YP, and LSYP of 24, 3, and 1 respectively. Fluid 2 formulated with 3 ppb CDDH gave a PV, YP, and LSYP of 25, 15, and 4 respectively. Fluid 3 formulated with 6 ppb CDDH gave a PV, YP and LSYP of 23, 20, and 7 respectively Thus, Fluid 2 showed a 300% increase in LSYP and 400% increase in YP while Fluid 3 showed a 600% increase in LSYP and 567% increase in YP with a minimal effect on PV as compared to Fluid 1. This result shows that CDDH was able to substantially increase the yield point and low-end rheology (6 and 3 rpm readings) with a minimal increase in the plastic viscosity.

TABLE 1

Formulation of 90 pcf organoclay-free invert-emulsion drilling fluids (OWR 70:30)

| Formulation no. | Time min | Fluid 1 | Fluid 2 | Fluid 3 | Fluid 4 |
| --- | --- | --- | --- | --- | --- |
| Diesel, bbl[1] (base oil) | | 160.9 | 158.2 | 155.5 | 155.6 |
| EZMUL, ppb[2] (emulsifier) | 5 | 10 | 10 | 10 | 10 |
| LIME, ppb (emulsifier activator) | 5 | 1.5 | 1.5 | 1.5 | 1.5 |
| ADAPTA, ppb (Filtration control agent) | 5 | 2.5 | 2.5 | 2.5 | 2.5 |
| CaCl$_2$, ppb | 5 | 29.8 | 29.8 | 29.8 | 29.8 |
| Water, ppb | | 85.7 | 85.7 | 85.8 | 85.8 |
| Barite, ppb (Weighting agent) | 10 | 215.2 | 214.9 | 214.6 | 214.5 |
| CDDH, ppb (viscosifier) | 5 | — | 3 | 6 | — |
| Rhemod L, ppb (viscosifier) | 5 | — | — | — | 6 |
| Hot roll, 250° F. (121° C.), 500 psi (3450 KPa) | | | | | |
| 600 rpm | | 51 | 65 | 66 | 63 |
| 300 rpm | | 27 | 40 | 43 | 39 |
| 200 rpm | | 20 | 30 | 32 | 27 |
| 100 rpm | | 12 | 19 | 22 | 16 |
| 6 rpm | | 3 | 6 | 9 | 5 |
| 3 rpm | | 2 | 5 | 8 | 4 |
| PV, cp (centipoise) | | 24 | 25 | 23 | 24 |
| YP, lbs./100 ft$^2$ (0.049 kg/m$^2$) | | 3 | 15 | 20 | 15 |
| LSYP, lbs./100 ft$^2$ (0.049 kg/m$^2$) | | 1 | 4 | 7 | 3 |
| 10 sec gel strength, lbs./100 ft$^2$ (0.049 kg/m$^2$) | | 2 | 8 | 8 | 5 |
| 10 min gel strength, lbs./100 ft$^2$ (0.049 kg/m$^2$) | | 3 | 11 | 14 | 6 |
| 30 min gel strength, lbs./100 ft$^2$ (0.049 kg/m$^2$) | | 3 | 11 | 16 | 8 |

[1] 1 bbl or barrel is 42 gallons, or 191 liters.
[2] 1 ppb is 2.85 Kg/m$^3$

FIG. 4 is a plot 400 comparing the performance of CDDH to a commercial viscosifier in a clay-free drilling fluid. For a good drilling fluid, the LSYP value, which represents the low-end rheology, should generally be greater or equal to 7 lb./100 ft$^2$ (0.295 Kg/m$^2$). A high LSYP value for the drilling fluid helps to ensure good hole cleaning and provides greater barite sag resistance. The high LSYP value for Fluid 3 shows that CDDH was able to impart the required rheology to the organoclay-free invert-emulsion drilling fluids.

Figure 5:
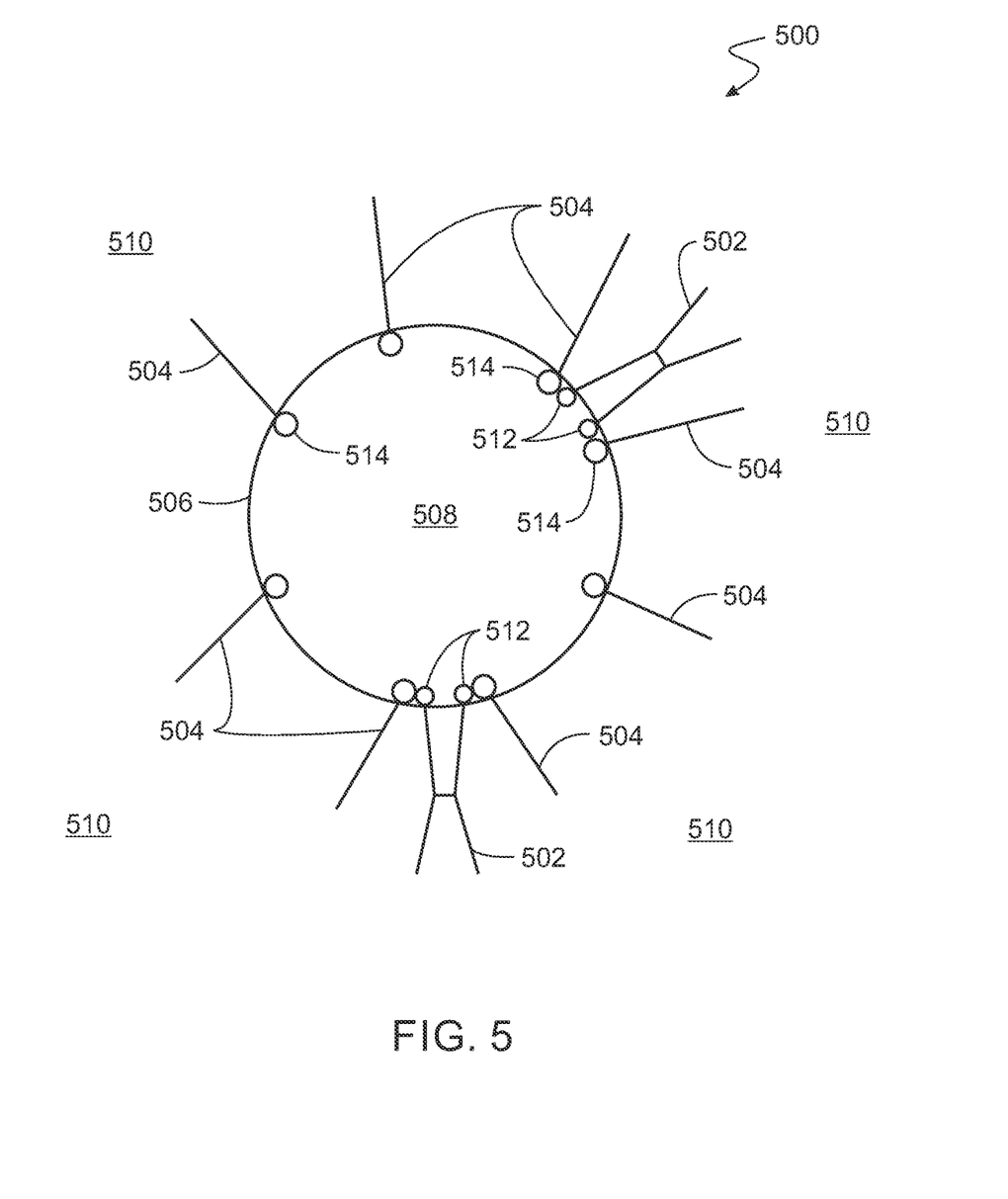
FIG. 5 is a schematic diagram of an invert-emulsion drilling fluid showing the interaction of CDDH 502 and emulsifier at an interface between a brine droplet 508 and an oil continuous phase.

FIG. 5 is a schematic diagram of an invert-emulsion drilling fluid 500 showing the interaction of CDDH 502 and emulsifier 504 at an interface 506 between a brine droplet 508 and an oil continuous phase 510. A possible explanation for enhanced rheology for organoclay free, invert-emulsion drilling fluid 500 using CDDH 502 is the interaction between the CDDH 502 and the emulsifier 504.

The CDDH 502 has a positive charge on the nitrogen group 512. The emulsifier 504 that is typically used to formulate an invert emulsion in the invert-emulsion drilling fluid 500 is a long chain compound with a carboxylate group 514. Lime, which is added to the drilling fluid forms a calcium salt of emulsifier 504. Both the emulsifier 504 and CDDH 502 are amphiphilic in nature, having they both have polar and non-polar groups. The polar COO$^-$ of the carboxylate group 514 of the emulsifier 504 and the polar NH$_3^+$ moiety of the nitrogen group 512 of the CDDH 502 would have an affinity for the aqueous phase of the brine droplet 508, whereas the non-polar group of the emulsifier 504 and C-36 non-polar group of the dimer diamine have an affinity for the hydrocarbon or oil phase of the oil continuous phase 510.

The oppositely charged COO$^-$ moiety of the carboxylate group 514 and the NH$_3^+$ moiety of the nitrogen group 512 of the emulsifier 504 and CDDH 502, respectively, will have strong interaction between them, which may lead to better packing of the emulsifier 504 and CDDH 502 at the interface 506 of the oil and brine phases of the invert-emulsion drilling fluid 500. Better packing of the molecules would result in lower interfacial tension between the oil continuous phase 510 and the brine droplet 508, leading to brine droplets that are both smaller and more stable. That will increase the rheology performance of the invert-emulsion drilling fluid 500.

Figure 6:
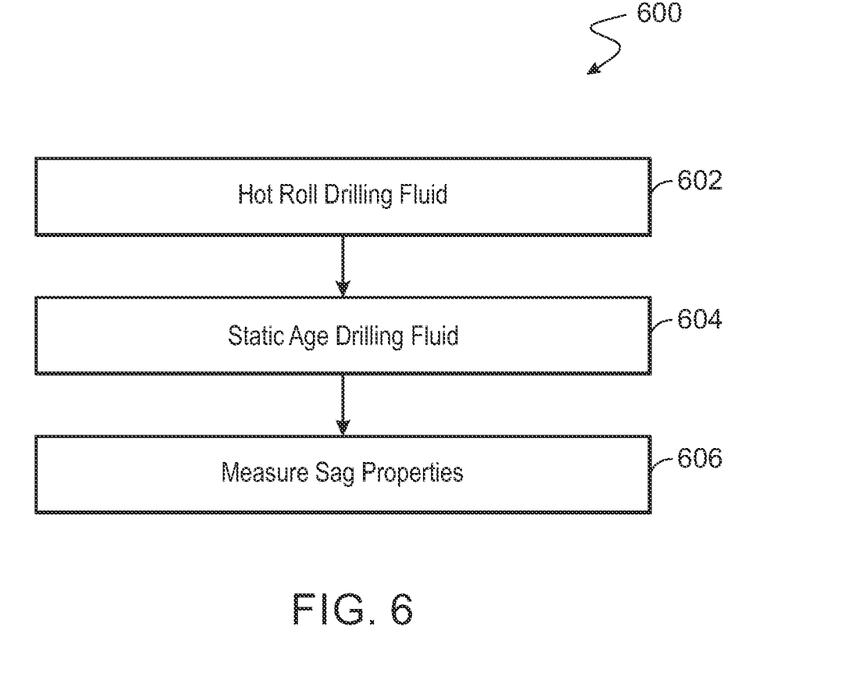
FIG. 6 is a process flow diagram of a method for testing the static aging of oil-based drilling fluids.

Static Aging Studies of 90 Pcf Organoclay Free, Invert-Emulsion Drilling Fluids Formulated with 6 Ppb CDDH Static aging studies were performed on the 90 pcf organoclay-free invert-emulsion drilling fluids formulated with 6 ppb CDDH (Fluid 3) and 6 ppb Rhemod L (Fluid 4) respectively to determine the sag-resistance of the fluid, over time. FIG. 6 is a process flow diagram of a method 600 for testing the static aging of oil-based drilling fluids. The method 600 begins at block 602, with hot rolling the drilling fluid. To perform this, the 90 pcf fluid was mixed in a stainless steel mixing cup using a five-spindle multimixer. The fluid was then aged in HPHT stainless steel (SS) aging cell in a hot rolling oven at 250° F. for 16 hours.

At block 604, the drilling fluid was static aged. After hot rolling, the HTHP aging cell was cooled and the fluid was then mixed on the multimixer for 5 min and then subsequently placed again in the aging cell. The aging cell was then set to 500 psi of pressure and placed in a mechanical convection oven at a desired temperature and duration. For the tests described here, the temperature of the oven was set to 121° C. (250° F.) for the aging, and the aging was run for 16 hours.

At block 606, the sag performance of the fluid was assessed by determining the sag factor. The specific gravity of the top ($SG_{top}$) and bottom ($SG_{bottom}$) portion of the fluid in the aging cell were determined by drawing 10 ml aliquots and measuring their weights on an analytical balance. The sag factor for the static aged fluid was then calculated using the formula in equation 4:

$$SagFactor = \frac{SG_{bottom}}{SG_{bottom} + SG_{top}} \qquad \text{EQN. 4}$$

In Equation 4, $SG_{bottom}$ is the density of the fluid at the bottom of the aging cell, and $SG_{top}$ is the density of the fluid at the top of the aging cell. Generally, a sag factor greater than 0.53 implies that the fluid has potential to sag, i.e., allow solids to settle.

Fluid 3 on static aging gave a sag factor of 0.512 while Fluid 4 gave a sag factor of 0.526. A sag factor of 0.512 implies that the fluid is resistant to barite sag. Fluid 3 formulated with CDDH gave a lower sag factor as compared with Fluid 4 formulated with Rhemod L. This showed that CDDH imparts better sag resistance as compared to the commercially available Rhemod L.

Embodiments

An embodiment described herein provides a method for preparing an invert-emulsion drilling fluid. The method includes reacting a C-36 dimer diamine with hydrochloric acid to form a C-36 dimer diamine dihydrochloride salt (CDDH). A non-aqueous solvent is mixed with an emulsifier to form an initial mixture. Calcium chloride is dissolved in water to form a calcium chloride solution. The CDDH is dissolved in the calcium chloride solution to form a CDDH solution. The CDDH solution is mixed with the initial mixture while stirring to form the invert-emulsion drilling fluid.

In an aspect, the method includes reacting the C-36 dimer diamine with a stoichiometric amount of concentrated hydrochloric acid.

In an aspect, the method includes adding barium sulfate to the invert-emulsion drilling fluid.

In an aspect, the method includes adding an organoclay to the invert-emulsion drilling fluid.

In an aspect, the method includes adding an emulsifier activator to the invert-emulsion drilling fluid.

In an aspect, the method includes adding a filtration control agent to the invert-emulsion drilling fluid.

In an aspect, the method includes dissolving calcium chloride in the water before adding the CDDH to form the CDDH solution.

Another embodiment described in examples herein provides an invert-emulsion drilling fluid. The invert-emulsion drilling fluid includes a C-36 dimer diamine dihydrochloride salt (CDDH), an aqueous solvent, a non-aqueous solvent, an emulsifier, and calcium chloride.

In an aspect, the invert-emulsion drilling fluid includes between about 5 vol. % water and about 45 vol. % water.

In an aspect, the invert-emulsion drilling fluid includes between about 95 vol. % of a non-aqueous solvent and about 55 vol. % of the non-aqueous solvent.

In an aspect, the non-aqueous solvent includes mineral oil.

In an aspect, the non-aqueous solvent includes diesel oil.

In an aspect, the emulsifier includes an alkyl carbonate.

In an aspect, the invert-emulsion drilling fluid includes calcium hydroxide.

In an aspect, the invert-emulsion drilling fluid includes a weighting agent. In an aspect, the weighting agent comprises barium sulfate.

In an aspect, the invert-emulsion drilling fluid includes a filtration control agent.

Another embodiment described in examples herein provides a method for drilling a wellbore with an invert-emulsion drilling fluid. The method includes preparing the invert-emulsion drilling fluid by reacting a C-36 dimer diamine with hydrochloric acid to form a C-36 dimer diamine dihydrochloride salt (CDDH), dissolving the CDDH in water to form a CDDH solution, dissolving calcium chloride in the CDDH solution, mixing an emulsifier with a nonaqueous solvent to form an initial mixture, adding the CDDH solution to the initial mixture to form the invert-emulsion drilling fluid. Drilling fluid additives are added to the invert-emulsion drilling fluid to form a drilling mud. The drilling mud is used to remove cuttings from the wellbore during drilling.

In an aspect, the method includes pumping the drilling mud through a drill string to a drill bit disposed at the downhole end of the drill string, flowing the drilling mud through the drill bit during drilling, and carrying cuttings to the surface in the drilling mud.

In an aspect, the method includes removing the cuttings from the drilling mud, and recycling the drilling mud to the drill string.

Other implementations are also within the scope of the following claims.

What is claimed is:

1. A method for preparing an invert-emulsion drilling fluid, comprising:
    reacting a C-36 dimer diamine with hydrochloric acid to form a C-36 dimer diamine dihydrochloride salt (CDDH);
    drying the CDDH to form a CDDH solid;
    mixing a non-aqueous solvent with an emulsifier to form an initial mixture;
    dissolving calcium chloride in water to form a calcium chloride solution;
    dissolving the CDDH solid in the calcium chloride solution to form a CDDH solution; and mixing the CDDH solution with the initial mixture while stirring to form the invert-emulsion drilling fluid.

2. The method of claim 1, comprising reacting the C-36 dimer diamine with a stoichiometric amount of concentrated hydrochloric acid.

3. The method of claim 1, comprising adding barium sulfate to the invert-emulsion drilling fluid.

4. The method of claim 1, comprising adding an organo-clay to the invert-emulsion drilling fluid.

5. The method of claim 1, comprising adding an emulsifier activator to the invert-emulsion drilling fluid.

6. The method of claim 1, comprising adding a filtration control agent to the invert-emulsion drilling fluid.

* * * * *